(12) United States Patent
Agevik et al.

(10) Patent No.: US 8,885,442 B2
(45) Date of Patent: Nov. 11, 2014

(54) METHOD FOR DETERMINING AN ACOUSTIC PROPERTY OF AN ENVIRONMENT

(75) Inventors: Markus Agevik, Malmö (SE); Martin Nyström, Hörja (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 544 days.

(21) Appl. No.: 13/167,320

(22) Filed: Jun. 23, 2011

(65) Prior Publication Data

US 2012/0020189 A1 Jan. 26, 2012

Related U.S. Application Data

(60) Provisional application No. 61/368,148, filed on Jul. 27, 2010.

(30) Foreign Application Priority Data

Jul. 23, 2010 (EP) .................................... 10007701

(51) Int. Cl.
*H04S 7/00* (2006.01)
*G01H 7/00* (2006.01)

(52) U.S. Cl.
CPC . *G01H 7/00* (2013.01); *H04S 7/305* (2013.01)
USPC .......................................... 367/118; 381/63

(58) Field of Classification Search
USPC ......................................................... 381/63
See application file for complete search history.

(56) References Cited

U.S. PATENT DOCUMENTS

| 1,724,720 | A | 8/1929 | McCollum | |
|---|---|---|---|---|
| 5,319,611 | A * | 6/1994 | Korba | ............................. 367/98 |
| 7,096,120 | B2 | 8/2006 | Hull | |
| 7,158,645 | B2 * | 1/2007 | June et al. | ........................ 381/92 |
| 2006/0045294 | A1 | 3/2006 | Smyth | |

(Continued)

FOREIGN PATENT DOCUMENTS

| EP | 2 072 948 A1 | 6/2009 |
|---|---|---|
| JP | 2003-023668 A | 1/2003 |

(Continued)

OTHER PUBLICATIONS

Hasegawa IEICE Trans. Fundamentals, vol. E83-A, No. 6, Jun. 2000, pp. 973-978.*

*Primary Examiner* — Isam Alsomiri
*Assistant Examiner* — Hovhannes Baghdasaryan
(74) *Attorney, Agent, or Firm* — Renner, Otto, Boisselle & Sklar, LLP.

(57) ABSTRACT

The present invention relates to a method for determining an acoustic property of an environment. According to the method a sound signal and at least two reflection signals of the sound signal (are received, and for each of the reflection signals a time difference between a time of reception of the sound signal and a time of reception of the respective reflection signal is determined. Furthermore, for each of the reflection signals, an angle between a reception direction in which the sound signal was received and a reception direction in which the respective reflection signal was received is determined. Based on the determined time differences, the angles and predetermined constraints defining arrangement constraints of the sound reflecting surfaces an arrangement of the sound-reflecting surfaces is determined.

12 Claims, 4 Drawing Sheets

(56) References Cited

U.S. PATENT DOCUMENTS

| | | |
|---|---|---|
| 2006/0056638 A1 | 3/2006 | Schobben |
| 2006/0120533 A1* | 6/2006 | Chen .............................. 381/17 |
| 2006/0153391 A1* | 7/2006 | Hooley et al. .................. 381/17 |
| 2006/0262943 A1* | 11/2006 | Oxford ........................... 381/92 |
| 2011/0317522 A1* | 12/2011 | Florencio et al. ............. 367/129 |

FOREIGN PATENT DOCUMENTS

| | | |
|---|---|---|
| WO | 01/35118 A1 | 5/2001 |
| WO | 02/33930 A2 | 4/2002 |
| WO | 2004/054313 A2 | 6/2004 |
| WO | 2005/088339 A1 | 9/2005 |
| WO | 2008/119122 A1 | 10/2008 |
| WO | 2009/070098 A1 | 6/2009 |

* cited by examiner

METHOD FOR DETERMINING AN ACOUSTIC PROPERTY OF AN ENVIRONMENT

This application claims priority from U.S. Provisional Application Ser. No. 61/368,148, filed Jul. 27, 2010, and from European Patent Application No. EP 10007701.5, filed Jul. 23, 2010, the disclosures of which are incorporated herein in their entirety.

The present invention relates to a method for determining an acoustic property of an environment, a method for providing audio data to a user of headphones, and a method for determining a geographical position of a mobile device. In particular, the present invention relates to providing audio data to a user of headphones taking into account acoustic properties of an environment and to a method for determining a geographical position based on acoustic properties of an environment. Finally, the present invention relates to a mobile device adapted to perform the methods of the invention.

BACKGROUND OF THE INVENTION

Mobile devices, for example mobile phones, mobile music players like MP3 players, and mobile navigation systems are very popular and commonly used in all kinds of environments, for example in enclosed environments like in a car or in a room of a building or in outside environments. Furthermore, audio reproduction of audio data of the mobile device is commonly performed by earspeakers or headphones. However, when audio data is reproduced by earspeakers or headphones, this audio reproduction appears to the user as if the user would be in an acoustically dead room, a so called anechoic room. Therefore, some mobile devices provide special acoustic filters simulating a certain environment, for example or a church or a stadium. However, commonly this does not match appropriately to the environment where the user stays and therefore there is a mismatch between the acoustic sound and the optic environment experienced by the user.

Another popular feature of mobile devices is the ability to determinate a current position of the mobile device. This ability may be used for navigating or guiding a user in unknown environments. However, in enclosed environments, for example in buildings, satellite signals for determining the position cannot be received always properly and thus a determination of the position in such enclosed environments is not possible. To overcome this problem, some mobile devices include acceleration sensors to determine relative movements of the mobile device and thus to determine a global position. However, these acceleration sensors add additional costs to the mobile device and do not provide accurate positioning information especially when the mobile device experiences a lot of movements in various directions.

Therefore, it is an object of the present invention to overcome the above-described problems by providing a user of headphones improved audio data and by providing an improved position determination for a mobile device. As will be seen from the following summary of the invention, for solving these problems a common underlying problem has to be solved namely an appropriate method for determining an acoustic property of an environment.

SUMMARY OF THE INVENTION

According to the present invention, these objects are achieved by a method for determining an acoustic property of an environment as defined in claim 1, a method for providing audio data to a user of headphones as defined in claim 4, a method for determining a geographical position of a mobile device as defined in claim 6, and a mobile device as defined in claim 11. The dependent claims define preferred and advantageous embodiments of the invention.

According to an aspect of the present invention, a method for determining an acoustic property of an environment is provided. According to the method, a sound signal and at least two reflection signals of the sound signal are received. For each of the reflection signals a time difference between a time of reception of the sound signal and a time of reception of the respective reflection signal is determined. Furthermore, for each of the reflection signals an angle between a reception direction of the received sound signal and a reception direction of the respective received reflection signal is determined. Based on the determined time differences, the determined angles and predetermined constraints an arrangement of sound reflecting surfaces in the environment is determined. The predetermined constraints define predetermined arrangement constraints of the sound reflecting surfaces. The predetermined arrangement constraints may comprise predetermined orientations of the sound reflecting surfaces with respect to each other. For example, in case of a room, the predetermined arrangement constraints may define that walls of the room are arranged in general perpendicular to a ceiling or a floor of the room, or perpendicular to each other.

An acoustic property of an environment, especially of an enclosed environment like a room, is significantly defined by geometric properties of the environment, in particular by the arrangement of the walls, the floor and the ceiling of the room. By listening to sounds created in the environment with a directional sensing microphone system and correlating received sound patterns, a direction to the source of the sound and a direction to a point where the sound signal is reflected can be determined. However, as will be described in the detailed description below, it is not possible by just passive listening to the sounds to determine a distance to the source of the sound or a distance to the point where the sound is reflected, as only a time difference between receiving the sound signal and the reflection signal can be determined. Therefore, according to the present invention, at least a second reflection signal of the sound signal is received and the direction of this second reflection signal is determined. Assuming that the first reflection signal was reflected at a first surface in the environment and the second reflection signal was reflected at a second surface in the environment, the determined information still does not allow to determine the arrangement of the reflecting surfaces, as there still exists a plurality of solutions for arranging the two reflecting surfaces in different angles and distances. Therefore, according to the present invention additional predetermined constraints defining arrangement constraints of the sound reflecting surfaces are considered and thus an unambiguous arrangement can be determined from the plurality of arrangements. Very simple arrangement constraints can serve for this purpose, for example a constraint defining that the walls of a room are arranged in general perpendicular to a ceiling and a floor of the room. Thus, with the method of the present invention geometric properties defining an acoustic property of an environment can be determined just by listening to sounds created in the environment. As the method relies on passive listening to sounds in the environment, an active emission of sound for determining acoustic properties of the environment is not necessary and therefore this determination can be performed without being noticed by a person or device in the environment and the determination is not disturbed by environmental sounds. Therefore the determination of acoustic properties of the environment according to the invention can be performed continuously without attracting attention.

According to an embodiment, more than two reflection signals of the sound signal may be received and the respective time differences and angles may be determined. This allows to determine an arrangement of more sound reflecting surfaces of the environment and thus a whole geometry of a room can be determined and based on the geometry, acoustic properties of the environment can be determined. Furthermore, the reflection signals can be compared with the sound signal and a quality factor of the reflection, defining for example a diffuse reflection or a hard reflection, can be defined. The quality factor may be additionally used to determine the acoustic property of the environment.

According to another aspect of the present invention a method for providing audio data to a user of headphone or earspeakers is provided. According to the method an acoustic property of an environment where the user is located is determined. Based on audio data which is to be output to the user and based on the determined acoustic property of the environment, three-dimensional audio data is created. The three-dimensional audio data may be created by a simulation of a propagation of the audio data to be output to the user in the environment based on the property of the environment. Thus, although the user is wearing headphones, the user gets the impression that the audio data is propagating three-dimensionally in the environment and influenced by the environment, for example by reflections or reverberation. The listening experience of the user becomes much more realistic as hearing the created three-dimensional audio data matches to the environment the user is looking at.

According to an embodiment, the acoustic property of the environment may be determined by the method for determining an acoustic property of an environment described above. Additionally or as an alternative, the acoustic property of the environment may be determined by determining a reverberation property of the environment. Thus, a realistic listening experience can be provided in a lot of different environments.

According to another aspect of the present invention a method for determining a geographical position of a mobile device is provided. A look-up table is provided which comprises acoustic properties of environments and associated geographical positions of the corresponding environments. According to the method, an acoustic property of an environment where the mobile device is located is determined. Next, an environment having a property corresponding to the determined acoustic property is searched in the look-up table and the corresponding geographical position of the environment is retrieved from the look-up table and determined as the position of the mobile device.

Assuming that each environment, especially enclosed environments like rooms, have a unique acoustic property like an acoustic fingerprint of the environment, an environment or a room can be identified by determining the acoustic property. In combination with the look-up table comprising geographical positions of the environments or rooms associated to acoustic properties of the environments, a geographical position of the mobile device can be easily derived without having the need for receiving positioning signals from for example a satellite based global positioning system or a positioning system based on radio communication of a mobile communication network as it is known in the art. Therefore, even in environments in which radio signals cannot be received properly, for example in a cellar or inside of electromagnetically shielded buildings, a position determination is possible.

According to an embodiment, the geographical position of the mobile device is additionally determined by taking into account a physically determined movement of the mobile device. The physically determined movement may be determined by a gyroscope, accelerometers or any other kind of appropriate movement sensors of the mobile device. By considering additionally the physically determined movement of the mobile device, the geographical position of the mobile device can be determined more precisely.

According to another embodiment, the acoustic property of the environment may be determined according to the above-described method for determining an acoustic property of an environment, or may be determined by determining a reverberation property of the environment. This allows a continuous determination of the acoustic properties of the environment and thus a continuous position determination of the mobile device.

According to another embodiment, during a movement of the mobile device, a further position of the mobile device is determined based on the previously determined position and a physically determined movement of the mobile device. The movement may be determined by an acceleration sensor of the mobile device. Furthermore, a further acoustic property of an environment at the further position is determined. Finally, the further acoustic property and the associated further position are stored in the look-up table. In this way the look-up table can be built up or gets more entries to increase a positioning accuracy.

Finally, according to the present invention, a mobile device is provided. The mobile device comprises a directional microphone system adapted to receive a sound signal and to indicate the receive direction of the sound signal. Furthermore, the mobile device comprises a processing unit which is coupled to the directional microphone system. The mobile device is adapted to receive a sound signal and at least two reflection signals of the sound signal. Furthermore, the mobile device is adapted to determine for each of the reflection signals a time difference between a time of reception of the sound signal and a time of reception of the respective reflection signal, and to determine for each of the reflection signals an angle between a reception direction of the received sound signal and a reception direction of the respective received reflection signal. Based on the determined time differences, the angles and predetermined constraints which define arrangement constraints of sound reflecting surfaces in an environment of the mobile device, an arrangement of the sound reflecting surface is determined. The mobile device may be adapted to perform any one or a combination of the above-described methods and comprises therefore the above-described advantages.

The mobile device may comprise a mobile phone, a mobile navigation system or a mobile music player or a combination of these devices.

Although specific features described in the above summary and the following detailed description are described in connection with specific embodiments, it is to be understood that the features of the embodiments can be combined with each other unless noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It is to be understood that the features of the various exemplary embodiments described therein may be combined with each unless specifically noted otherwise. Same reference signs in the various instances of the drawings refer to similar or identical components.

Figure 1:
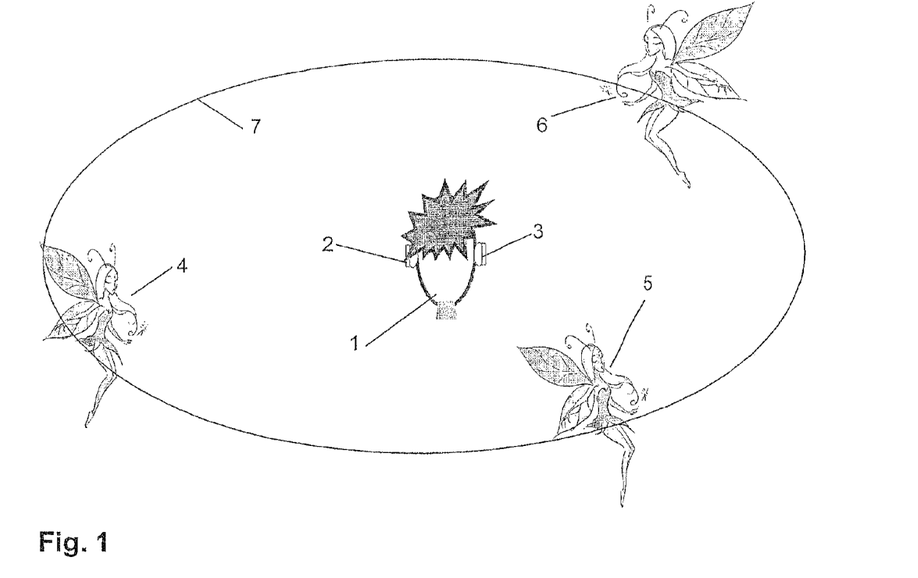
FIG. 1 shows schematically a user listening to a three-dimensional sound.

FIG. 1 shows a user 1 wearing headphones or earspeakers 2, 3. Three-dimensional audio data comprising for example sounds of fairies 4-6 moving around the user 1 on a circular path 7, shall be output to the user 1 via the earspeakers 2, 3. Outputting acoustic data via the earspeakers 2, 3 in such a way as if it appears to the user 1 as if the sound sources 4-6 are arranged and moving three-dimensionally in an area around the user, is known in the art and will therefore not be described in detail herein.

Figure 2:
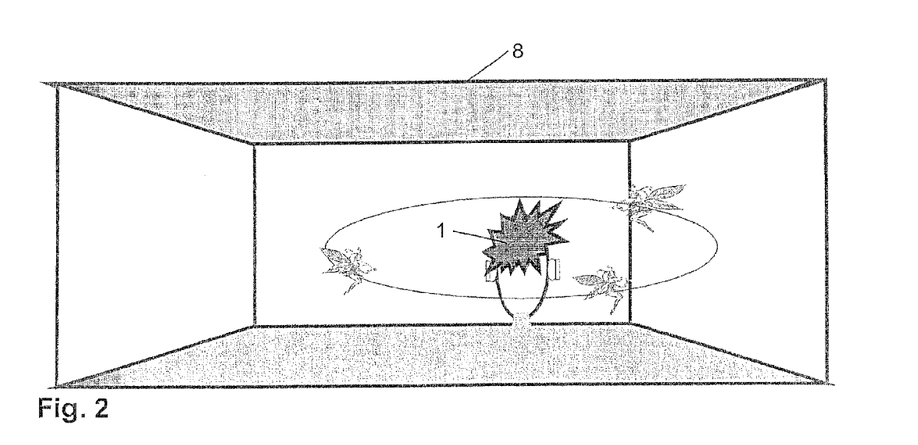
FIG. 2 shows schematically a user listening to a three-dimensional sound in a room.

However, when the user 1 is located in a specific environment, for example in a room as shown in FIG. 2, there will be a mismatch between the three-dimensional sound created and reproduced via the earspeakers 2, 3 and the three-dimensional sound the user 1 expects, as due to the user's experience there should be sound reflections and reverberation effects due to the walls and other objects of the room 8. This mismatch between the sound the user 1 is hearing and the sound the user 1 is expecting due to the environment, can be corrected electronically by the device generating the three-dimensional sound, but for this the device needs information about acoustic properties of the environment the user is staying in. Therefore, in connection with FIGS. 3-7, a method for determining an acoustic property of an environment will be described in more detail. The method described in the following is based on passive listening to sounds of the environment. Therefore, an explicit emission of sound or audio data is not necessary and therefore neither the user nor anyone else in the environment will be disturbed or even notice that the acoustic properties of the environment are determined.

Figure 3:
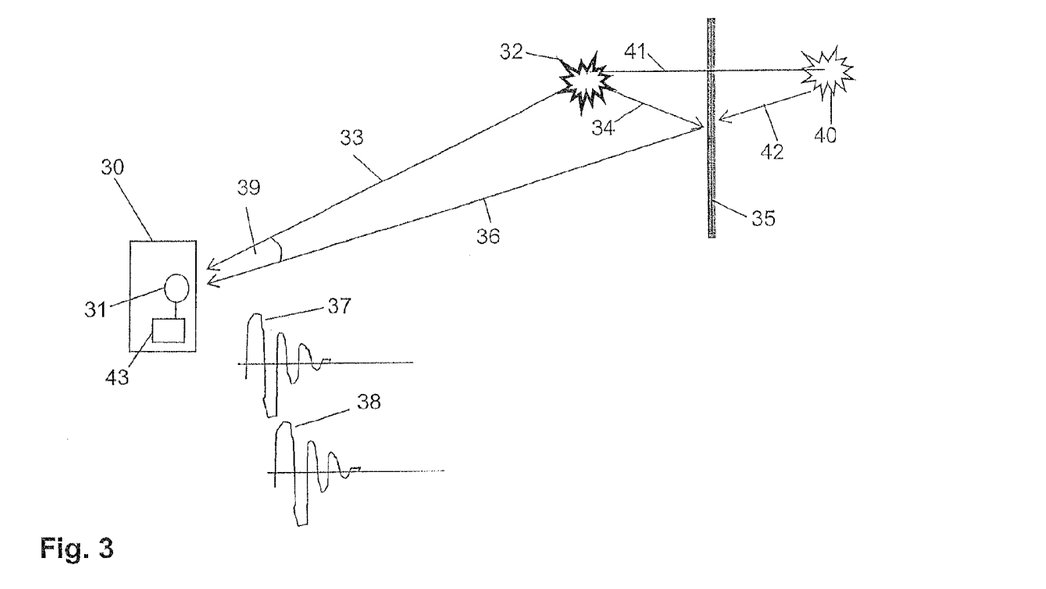
FIG. 3 shows schematically a mobile device receiving a sound signal and a reflection signal of the sound signal reflected at a sound reflecting surface.

FIG. 3 shows some basics explaining how an acoustic property of an environment acts on a sound signal and which information can be derived at a certain point by just listening to sound signals in the environment.

FIG. 3 shows a sound-receiving device 30, for example a mobile device 30 like a mobile phone, a mobile music player or a mobile gaming device. The mobile device 30 comprises a directional microphone system 31 which is adapted to receive acoustic sound signals from an environment and to determine a direction from which the sound signal was received. Furthermore, the device 30 comprises a processing unit 43 coupled to the directional microphone system 31 and adapted to process the information from the directional microphone system 31 as will be described below.

Operation of the mobile device 30 receiving a sound signal and a reflection signal of the sound signal reflected at a sound reflecting surface will now be described in more detail. Assuming a sound signal 32 is generated in an environment of the mobile device 30, sound waves will be distributed in all directions. One sound wave will be directly received by the directional microphone system 31 as indicated by arrow 33 and another sound wave 34 will be reflected at the sound reflecting surface 35 and then indirectly propagated to the directional microphone system 31 as indicated by arrow 36. As seen from perspective of the mobile device 30, two sound signals 37 and 38 are received and by correlating the two sound signals 37 and 38, the mobile device 30 may determine that the two sound signals 37 and 38 are in general identical sound waves from a common sound source having a time shift there between. Furthermore, the directional microphone system 31 is adapted to determine an angle 39 between the direction of reception of sound wave 33 and a direction of reception of sound wave 36. The reflected sound wave signal 36 can be considered as a signal from a mirrored sound source 40 wherein the reflecting surface 35 is in the middle between the sound source 32 and the mirrored sound source 40 and perpendicular with respect to a connecting line 41 between the sources 32 and 40. The distance 34 from sound source 32 to the reflecting surface 35 corresponds to the distance 42 from the mirrored sound source 40 to the reflecting surface 35. The time shift between the received audio signals 37 and 38 results from the difference between the distance 33 between the sound source 32 and the directional microphone system 31 and the distance 36 plus the distance 42 between the mirrored sound source 40 and the directional microphone system 31. However, based on the angle 39 and the time shift between the received audio signals 37 and 38 an absolute position of the sound source 32 and the reflecting surface 35 cannot be determined unambiguously, as will be described below in connection with FIG. 4.

Figure 4:
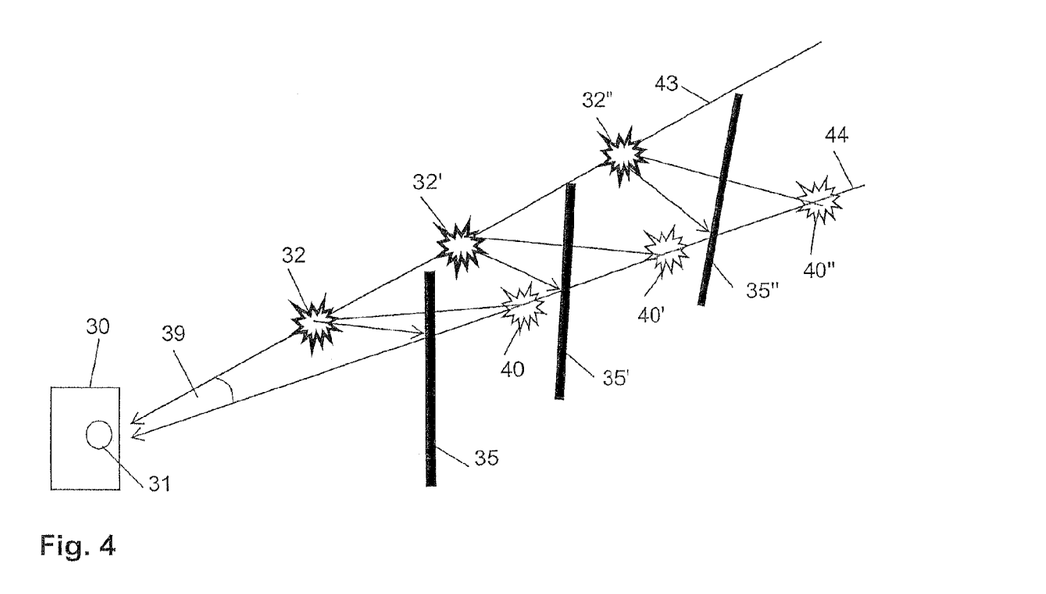
FIG. 4 shows a mobile device receiving a sound signal and a reflection signal reflected at a sound reflecting surface. The Figure shows three possible arrangements of the sound reflecting surface which all lead to the same signals received at the mobile device.

In FIG. 4 three different arrangements of the sound source 32 and the sound reflecting surface 35 are shown resulting in the same angle 39 and the same time difference between the time of reception of the sound signal from the sound source directly and the time of reception of the respective reflection signal reflected at the reflecting surface. As can be seen in FIG. 4, the distance difference between sound source 32 and mirrored sound source 40 with respect to the directional microphone system 31 is the same as the distance difference between sound source 32' and mirrored sound source 40' with respect to the microphone system 31, and is also the same as the distance difference between the sound source 32" and the mirrored sound source 40" with respect to the directional microphone system 31. The sound sources 32, 32', and 32" are all arranged on a common line 43 and the mirrored sound sources 40, 40', and 40" are all arranged on a common line 44. Therefore, not only the distance differences and thus the time differences between receptions are the same, but also the angle between the reception directions of the sound sources and mirrored sound sources is always the same.

Figure 5:
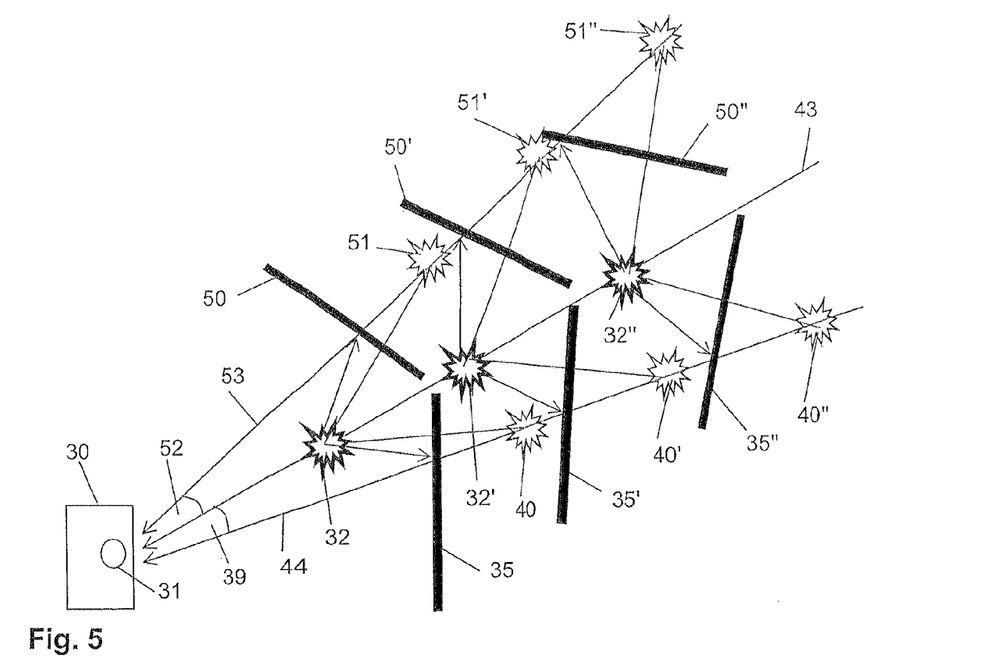
FIG. 5 shows a mobile device receiving a sound signal and two reflection signals reflected at two different sound reflecting surfaces. The Figure shows three different arrangements of the reflecting surfaces which all lead to the same signals received by the mobile device.

Even if more reflection signals reflected at further sound reflecting surfaces are detected by the directional microphone system 31, this ambiguity cannot be solves as shown in FIG. 5. In FIG. 5 the sound signal from the sound source 32 is reflected at two surfaces 35 and 40, and the directional microphone system 31 receives a sound signal directly from the sound source 32, a first reflection signal from the sound signal reflected at surface 35 and a second reflection sound signal reflected at the second surface 50. The mirrored sound sources 40 and 51 represent the sound sources mirrored due to the reflection on reflecting surface 35 and 50, respectively, as described in connection with FIG. 3. The mobile device 30 comprising the directional microphone system 31 is thus adapted to determine a first time difference between reception of the sound signal from the sound source 32 and the mirrored sound source 40 and a second time difference between the time of reception of the signal from the signal source 32 and the time of reception of the signal of the mirrored signal source 51. Furthermore, the mobile device is adapted to determine a first angle 39 between received directions of sounds from the sound source 32 and the mirrored sound source 40, and a second angle between receive directions of the sound source 32 and the mirrored sound source 51. However, an unambiguous arrangement of the sound source 32 and the sound reflecting surfaces 35 and 50 cannot be determined as there are a lot of possible solutions matching to the received time differences and reception angles. As can be seen from FIG. 5, an arrangement of sound source 32', reflecting surface 35' and reflecting surface 50' resulting in mirrored sound sources 40' and 51' leads to the same time differences and reception angles as the previously described arrangement of sound source 32 and reflecting surfaces 35 and 50. The same applies to the arrangement of sound source 35", reflecting surface 35" and reflecting surface 50" and the resulting mirrored sound sources 40" and 51".

Figure 6:
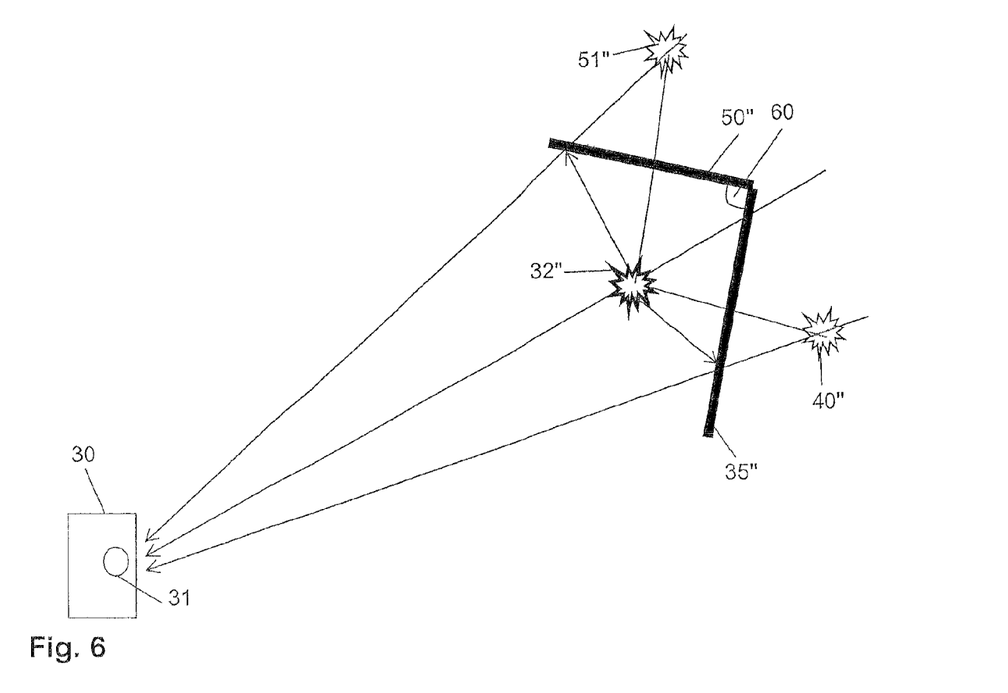
FIG. 6 shows a mobile device receiving a sound signal and two reflection signals reflected at two sound reflecting surfaces that are arranged perpendicular to each other.

For solving this ambiguity, according to the present invention, an assumption on the arrangement of the reflecting surfaces 35 and 50 is made. For example, for buildings or rooms in buildings it can be assumed that at least walls are arranged perpendicular to a floor or a ceiling of the room. Taking into account such an assumption or constraint, one arrangement of the various arrangements shown in FIG. 5 can be uniquely identified as shown in FIG. 6. In the example shown in FIG. 5 only the arrangement comprising reflecting surfaces 50" and 35" fulfils the constraint of a perpendicular arrangement. This is shown in FIG. 6 indicating a right angle 60 between the reflecting surfaces 35" and 50". Thus, taking into account such simple room constraints allows to determine a detailed room geometric including an arrangement of the mobile device inside the room by just listening to sound sources and reflections of the sound sources in the room.

Figure 7:
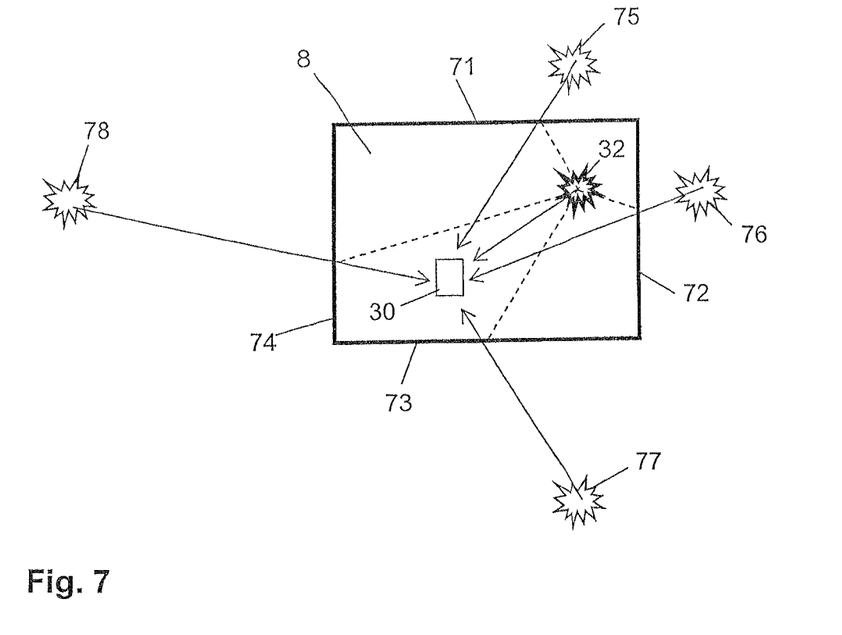
FIG. 7 shows a mobile device receiving a sound signal and four reflection signals reflected at four different sound reflecting surfaces.

FIG. 7 shows a top view of a room 70 having four walls 71-74. Assuming that the room 70 has a rectangular footprint and the walls 71-74 are each arranged perpendicular with respect to neighboring walls, the mobile device 30 can determine the size and geometric of the room 70 by listening to a sound emitted from sound source 32 and the respective mirrored sound sources 75-78 as described in connection with FIGS. 5 and 6. Furthermore, a location and arrangement of the mobile device 30 within the room 70 can be determined. Based on this information three-dimensional audio data to be played back to a user of the mobile device 30 in the room 70 can be adapted accordingly such that the user gets the impression that sounds of the three-dimensional audio data is influenced by the acoustic properties of the room 70, for example by adding respective reverberations and sound reflections by simulating a sound propagation of the three-dimensional audio data in the room 70.

Figure 8:
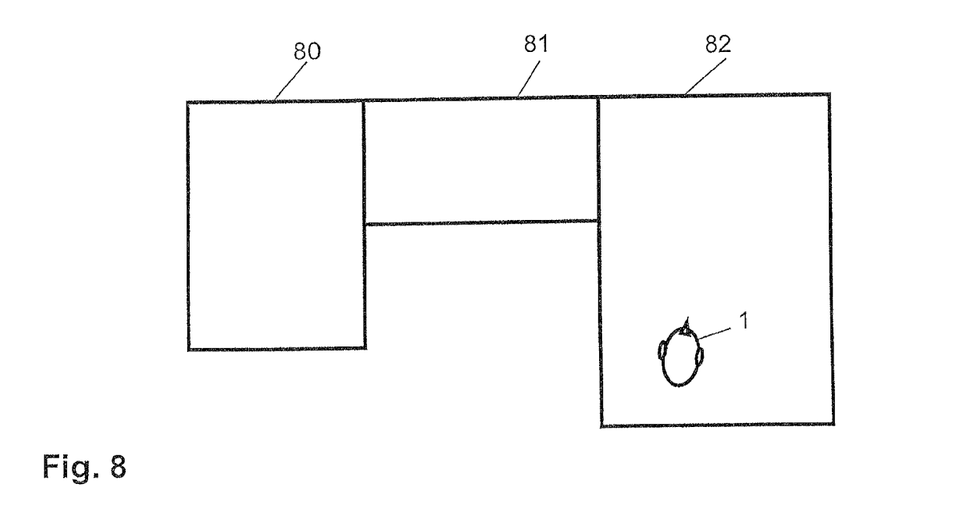
FIG. 8 shows three rooms having different acoustic properties and a user in one of the rooms.

Determining the acoustic properties of the room 70 may furthermore be used for identifying a room and thus for determining a current global position. When a user of a mobile device is moving within a large building which is unknown to the user, the user may need a navigation help. However, if reception of radio signals of for example satellite-based global positioning systems is not possible within the building, an automatic navigation with the help of the mobile device has to rely on other information. In this case, the mobile device may take advantage of the fact that each room has a more or less unique acoustic property like a fingerprint. Thus, by determining the acoustic property of the environment with the mobile device and retrieving a corresponding position from for example a data base providing an association between acoustic properties and positions, the mobile device can provide the user a current position just by listening to sounds in the environment as described before in connection with FIGS. 5-7. As shown FIG. 8, when the user 1 enters one of the rooms 80-82 the position of the user can be determined by determining the acoustic property of room and looking-up the corresponding position in the look-up table. If the determined acoustic properties of the current environment does not match to any of the acoustic properties stored in the look-up table, the current position may be determined based on a previous position and a relative movement determined by for example by an accelerometer of the mobile device. Based on this information a new entry in the look-up table can be created. Furthermore, based on a determination that the user has left a room (e.g. indicated by an accelerometer), a new determination of acoustic properties of the environment can be initiated for determining the current new position of the user. The acoustic properties may comprise further information, for example reflection qualities of walls indicating if the wall provides a hard reflection or a diffuse reflection.

While exemplary embodiments have been described above, various modifications may be implemented in other embodiments. The directional microphone system may comprise a directional sensing binaural system or any other kind of directional sensing microphone system. Furthermore, determining acoustic properties of an environment may comprise only a determination of a typical reverberation of the room. As reverberation is essential for human distance determination of sounds, adding reverberation corresponding to the room where the user is located to the three-dimensional audio data, would enhance the distance determination of the virtually placed sound. Furthermore, other constraints concerning the reflecting surfaces may be used, for example a box shape of a room may be assumed. Furthermore, determining the acoustic property of the environment may comprise listening to several sounds of one or more sound sources and the respective reflections. Thus, additional sounds and additional reflections help to describe the acoustic property of the environment more precisely. Thus a model of the environment or the room can be continuously built up.

Finally, it is to be understood that all the embodiments described above are considered to be comprised by the present invention as it is defined by the appended claims.

The invention claimed is:

1. A method for determining an acoustic property of an environment using a directional microphone system having direction microphones each arranged to detect sound waves from a corresponding direction, the method comprising:

detecting a sound signal and at least two reflected sound signals of the sound signal with respective directional microphones of the directional microphone system, automatically determining for each of the reflected sound signals a time difference between a time of reception of the sound signal and a time of reception of each reflected sound signal, automatically determining for each of the reflected sound signals an angle between a reception direction in which the sound signal was received and a reception direction in which each reflected sound signal was received, and automatically determining an arrangement of sound reflecting surfaces in the environment based on the determined time differences, angles and predetermined constraints defining arrangement constraints of the sound reflecting surfaces, wherein the constraints comprise predetermined orientations of the sound reflecting surfaces with respect to each other.

2. The method according to claim 1, wherein the environment comprises a room and the constraints define that walls of the room are arranged in general perpendicular to a ceiling or a floor of the room.

3. A method for providing audio data to a user of headphones, the method comprising:

determining an acoustic property of an environment where the user is located using the method of claim 1, and creating three dimensional audio data based on audio data to be output to the user and the determined acoustic property of the environment.

4. The method according to claim 3, wherein creating the three dimensional audio data comprises a simulation of a propagation of the audio data to be output to the user in the environment based on the property of the environment.

5. A method for determining a geographical position of a mobile device, the method comprising:

providing a look-up table comprising acoustic properties of environments and associated geographical positions of the environments, determining an acoustic property of an environment where the mobile device is located using the method of claim 1, and determining the position of the mobile device by searching in the look-up table for an environment having a property corresponding to the determined acoustic property and retrieving the corresponding geographical position of the environment.

6. The method according to claim 5, wherein the step of determining the position of the mobile device additionally comprises determining a physically determined movement of the mobile device.

7. The method according to claim 6, comprising:

determining a further position of the mobile device based on the determined position and a physically determined movement of the mobile device, determining a further acoustic property of an environment at the further position, and storing the further acoustic property and the associated further position in the look-up table.

8. The method according to claim 7, wherein the acoustic property of the environment is determined according to the method according to claim 1.

9. The method according to claim 8, wherein the acoustic property of the environment is determined by determining a reverberation property of the environment.

10. A mobile device, comprising a directional microphone system having direction microphones each arranged to detect sound waves from a corresponding direction, and a processing unit coupled to the directional microphone system, wherein the mobile device is adapted to detect a sound signal and at least two reflected sound signals of the sound signal with respective directional microphones of the directional microphone system, to determine for each of the reflected sound signals a time difference between a time of reception of the sound signal and a time of reception of the respective reflected sound signal, to determine for each of the reflected sound signals an angle between a reception direction in which the sound signal was received and a reception direction in which the respective reflected sound signal was received, and to determine an arrangement of sound reflecting surfaces in an environment of the mobile device based on the determined time differences, angles and predetermined constraints defining arrangement constraints of the sound reflecting surfaces, wherein the constraints comprise predetermined orientations of the sound reflecting, surfaces with respect to each other.

11. The mobile device according to claim 10, wherein the mobile device is adapted to perform the method according to claim 1.

12. The mobile device according to claim 11, wherein the mobile device comprises a mobile device selected from the group comprising a mobile phone, a mobile navigation system, and a mobile music player.

\* \* \* \* \*